No. 627,551. Patented June 27, 1899.
G. VIDLUND.
ANTIFRICTION BEARING.
(Application filed Sept. 2, 1898.)
(No Model.)
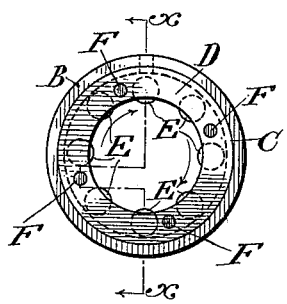
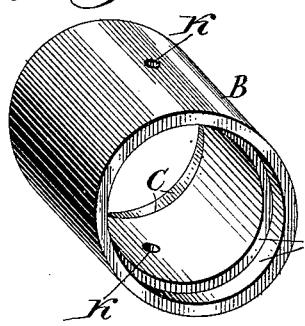
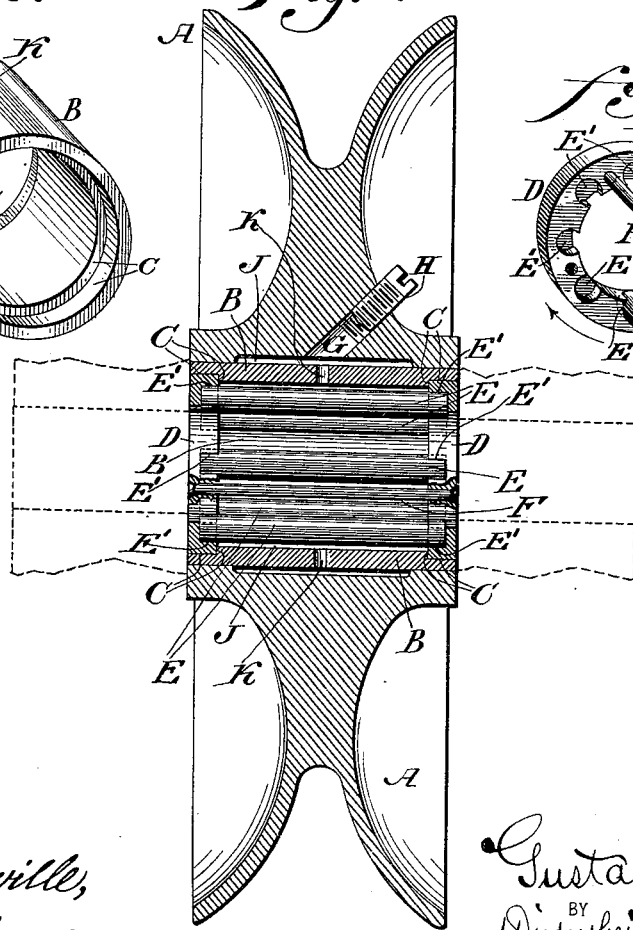
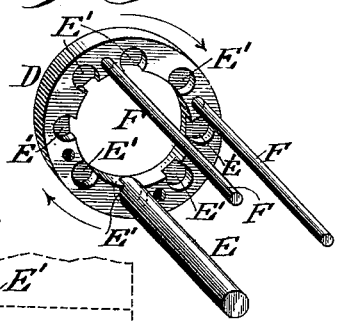
WITNESSES:
INVENTOR
Gustav Vidlund
BY
ATTORNEYS.

UNITED STATES PATENT OFFICE.

GUSTAV VIDLUND, OF PHILADELPHIA, PENNSYLVANIA.

ANTIFRICTION-BEARING.

SPECIFICATION forming part of Letters Patent No. 627,551, dated June 27, 1899.

Application filed September 2, 1898. Serial No. 690,089. (No model.)

*To all whom it may concern:*

Be it known that I, GUSTAV VIDLUND, a subject of the King of Sweden and Norway, (having resided in the United States one year last past and having declared my intention of becoming a citizen thereof,) residing in the city and county of Philadelphia, State of Pennsylvania, have invented a new and useful Improvement in Antifriction-Bearings for Pulleys, &c., which improvement is fully set forth in the following specification and accompanying drawings.

My invention consists of a pulley, &c., having an antifriction-bearing for a stationary shaft or axle, on which said wheel is mounted, said bearing consisting of a skeleton frame formed of rollers, annuli in which the ends of said rollers are mounted, and means for connecting said annuli, so that they rotate as one, said frame being freely mounted in a bushing which is fixed within the hub of the pulley, so that said antifriction-bearing rotates independently of the pulley at a less rate of speed, so that there is reduced friction on the shaft or axle. The bearing is also formed of metal superior to that of the body of the pulley, &c., thus increasing the durability of the latter without the expensiveness of an entire body formed of said superior metal.

Figure 1 represents an end view of an antifriction-bearing for a pulley embodying my invention. Fig. 2 represents a longitudinal section thereof on line $x\,x$, Fig. 1, including a diametrical section of the pulley. Fig. 3 represents a perspective view of a bushing, within which the bearing is mounted. Fig. 4 represents a perspective view of a portion of the bearing.

Similar letters of reference indicate corresponding parts in the figures.

Referring to the drawings, A designates a pulley which, excepting the features of my invention applied thereto, is of ordinary construction.

B designates a bushing which is firmly retained within the hub of the pulley, so as to rotate as one therewith, the bushing having in its interior, at its ends, the shoulders C, which extend in the peripheral direction of said bushing.

D designates annuli which freely occupy the opposite shoulders C of the bushing B at the ends of the latter and have freely mounted in them the series of rollers E E, it being noticed that the circumferential walls of the openings E' in the annuli to receive the rollers are cut away or open at the inner circumferences of the annuli, so that portions of the peripheries of the rollers D enter the central spaces of the annuli, so as to contact with the shaft or axle on which the pulley is mounted, said shaft or axle and portions of journal boxes or bearings therefor being shown in dotted lines, Fig. 2.

The annuli are connected by the bolts or rods F F, which are headed or otherwise secured to said annuli, whereby the latter rotate as one on the bushing, it being seen that said annuli cannot separate, owing to their retention by the bolts or rods F, nor come together or close, owing to the shoulders C, it being also noticed that the annuli, rollers, and rods form a skeleton frame which may rotate intact within the bushing, while the outer walls of the openings E' prevent lateral displacement of the rollers and dispense with tenons or reduced journals on the latter and permit the rollers to be of uniform diameters throughout, which adds greatly to their strength, said outer walls closing the outer sides of said slots and forming solid bearings for the end thrusts of the rollers.

In the hub portion of the pulley is the port G, which is closed by the plug H, said port leading to the channel J on the interior of said hub, said channel being in communication with the ducts K in the wall of the bushing B, it being seen that when the plug or stopper H is removed oil or lubricant may be admitted through the port G to the channel J and from thence directed through the ducts K to the interior of the bushing and so reach the rollers, annuli, and shoulders, whereby the parts of the skeleton frame may be nicely lubricated as it rotates within the bushing, it being also seen that as said frame rotates its speed is much less than the pulleys, and thus the friction on the shaft is reduced and wear of parts lessened, while the pulley runs smoothly, easily, and comparatively noiseless on its bearings. It will also be noticed that when the frame is primarily connected with the bushing the latter is forcibly driven into the hub, so as to be a fixture thereof, when the frame may receive the shaft or axle of the pulley and rotate therein, while the pulley is adapted to rotate at a greater rate of speed independent, of course, of said frame.

The bushing and frame will be formed of metal superior to that of the body of the pulley, whereby the durability of the latter is increased.

Having thus described my invention, what I claim as new, and desire to secure by Letters Patent, is—

1. An antifriction-bearing for a wheel consisting of annuli therein, and rollers mounted in said annuli, the latter having slots in the inner faces thereof, open at the inner circumferences of the annuli and walls on the outer faces of the annuli closing the outer sides of said slots.

2. An antifriction-bearing consisting of a rotatable skeleton frame, a fixed bushing on which said frame is mounted in combination with a wheel in whose hub said bushing is rigidly held, a chamber in said hub around said bushing and a port in said bushing forming communication between said chamber and the interior of said bushing, said bushing being formed of metal superior to that of the body of said wheel.

GUSTAV VIDLUND.

Witnesses:
ROBERT ARNER,
E. M. VIDLUND.